United States Patent [19]

Kolthammer et al.

[11] Patent Number: 5,453,410
[45] Date of Patent: Sep. 26, 1995

[54] CATALYST COMPOSITION

[75] Inventors: Brian W. S. Kolthammer; Robert S. Cardwell; John C. Tracy, all of Lake Jackson, Tex.

[73] Assignee: The Dow Chemical Company, Midland, Mich.

[21] Appl. No.: 108,693

[22] PCT Filed: Dec. 1, 1992

[86] PCT No.: PCT/US92/10360

§ 371 Date: Sep. 2, 1993

§ 102(e) Date: Sep. 2, 1993

[87] PCT Pub. No.: WO93/14132

PCT Pub. Date: Jul. 22, 1993

Related U.S. Application Data

[63] Continuation-in-part of Ser. No. 817,202, Jan. 6, 1992, abandoned.

[51] Int. Cl.[6] .................................................. B01J 31/00
[52] U.S. Cl. ........................ 502/155; 502/102; 502/103; 502/117; 502/152; 526/127; 526/160; 526/348.2; 526/348.6
[58] Field of Search ................................. 502/102, 103, 502/117, 152, 155; 526/127, 160

[56] References Cited

U.S. PATENT DOCUMENTS 5,026,798  6/1991  Canich ................................ 526/127
5,077,367  12/1991  Campbell, Jr. et al. ............. 526/284

FOREIGN PATENT DOCUMENTS 0416815  3/1990  European Pat. Off. ......... C08F/10/00
418044   3/1991  European Pat. Off. .
416815   3/1991  European Pat. Off. .

OTHER PUBLICATIONS

U.S. Ser. No. 545,403, filed Jul. 3, 1990, Francis J. Timmers et al., "Constrained Geometry Addition Polymerization Catalysts, Processes for Their Preparation, Precursors Therefor, Methods of Use and Novel Polymers formed Therewith".

Primary Examiner—David W. Wu

[57] ABSTRACT

An addition polymerization catalyst comprising a cationic complex of a Group 4 metal cyclopentadienyl derivative and an alumoxane shows improved resistance to catalyst poisons.

6 Claims, No Drawings

CATALYST COMPOSITION

CROSS-REFERENCE TO RELATED APPLICATION

This is a continuation-in-part of U.S. Ser. No. 07/817,202, filed Jan. 6, 1992, now abandoned the teachings of which are herein incorporated by reference.

BACKGROUND OF THE INVENTION

This invention relates to compositions of matter which are useful as addition polymerization catalysts, to a method for preparing these catalysts and to a method of using these catalysts. More particularly, this invention relates to catalyst compositions useful as olefin polymerization catalysts and to a method for polymerizing olefin monomers using the same.

In EP-A 416,815, published Mar. 13, 1991, there are disclosed certain constrained geometry complexes comprising a constrain inducing delocalized n-bonded moiety and metals of Groups 4–10 of the Periodic Table of the Elements. Such compositions formed catalysts in the presence of activating cocatalysts such as alkylalumoxanes, aluminum alkyls, aluminum halides, aluminum alkylhalides, Lewis acids, ammonium salts, noninterfering oxidizing agents and mixtures of the foregoing.

In U.S. Pat. No. 5,026,798 and U.S. Pat. No. 5,055,438 Group IV B metallocene compounds having a heteroatom ligand in combination with an alumoxane were disclosed as suitable olefin polymerization catalysts.

In EP-A418,044, published Mar. 20, 1991 (equivalent to U.S. Ser. No. 07/758,654 now U.S. Pat. No. 5,132,380) and in U.S. Ser. No. 07/758,660 now abandoned certain cationic derivatives of the foregoing constrained geometry catalysts that are highly useful as olefin polymerization catalysts are disclosed and claimed. In U.S. Ser. No. 720,041, filed Jun. 24, 1991, now abandoned certain borane derivatives of the foregoing constrained geometry catalysts are disclosed and a method for their preparation taught and claimed.

For the teachings contained therein, the aforementioned pending United States Patent applications, issued United States Patents and published European Patent Applications are herein incorporated in their entirety by reference thereto.

Although previously known cationic catalysts, especially the cationic catalysts disclosed in the foregoing applications and publications, have excellent activity, they are extremely sensitive to catalyst poisons, such as polar impurities, that may be contained in a polymerization mixture. Because of this fact, catalyst lifetimes have been limited and molecular weights of the resulting polymers have been reduced.

It is previously known in the art to utilize adjuvants such as trialkylboron and trialkylaluminum compounds to remove catalyst poisons from biscyclopentadienyl containing olefin polymerization catalysts. Disadvantageously however, such adjuvants have proven to be ineffective in combating the inhibition of cationic catalysts, especially cationic, constrained geometry catalysts, and when used in the polymerization of olefin monomers especially, actually may interfere with the desired catalytic process.

In *J. Am. Chem. Soc.*, 113, 8570–8571 (1991), it has furthermore been reported that the use of alumoxanes in combination with biscyclopentadienyl containing cationic catalysts results in detrimental interference with the catalyst for propylene polymerizations.

It would be desirable if there were provided improved, cationic catalyst compositions having constrained geometry that are resistant to the effects of catalyst poisons.

In particular, it would be desirable if there were provided improved, cationic, constrained geometry, catalyst compositions having extended catalyst lifetimes and improved polymerization efficiencies.

SUMMARY OF THE INVENTION

The present investigations have led to certain improved cationic catalyst compositions that are highly active as addition polymerization catalysts and desirably have improved resistance to catalyst poisons.

According to the present invention there is now provided a catalyst composition comprising in combination:

a cationic complex of the formula:

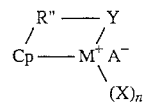

wherein:

M is a metal of Group 4 of the Periodic Table of the Elements having an oxidation state of +3 or +4, bound in an $\eta^5$ bonding mode to Cp;

n is zero or one, depending on the oxidation state of M;

Cp is a cyclopentadienyl-, indenyl-, tetrahydroindenyl-, fluorenyl-, or octahydrofluorenyl-group covalently substituted with a divalent moiety, R", said divalent moiety, R", having from 1 to 50 atoms and being covalently bonded to Y, Cp further may be substituted with from 1 to 4 alkyl, halogen, aryl, haloalkyl, alkoxy, aryloxy or silyl groups containing up to 20 non-hydrogen atoms;

Y is a divalent substituent selected from groups of the formula —NR—, —PR—, —O— or —S—, wherein R is $C_{1-20}$ hydrocarbyl, and Y together with R", Cp and M forms a metallocycle;

X, if any, is a monovalent substituent selected from the group consisting of hydride, halo, alkyl, aryl, silyl, germyl, aryloxy, alkoxy, amide, siloxy, and phosphine groups, and combinations thereof, said groups or combination having up to 20 non-hydrogen atoms; and $A^-$ is an inert, noncoordinating anion, and an alumoxane;

the molar ratio of alumoxane to cationic complex being from 0.1:1 to 50:1.

The foregoing catalyst compositions in a preferred embodiment comprise the reaction product of:

a) an organometallic complex of the formula:

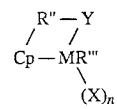

wherein:

M is a metal of Group 4 of the Periodic Table of the Elements having an oxidation state of +3 or +4, bound in an $\eta^5$ bonding mode to Cp;

n is zero or one, depending on the oxidation state of M;

R'" is hydride or $C_{1-20}$ hydrocarbyl;

Cp is a cyclopentadienyl-, indenyl-, tetrahydroindenyl-, fluorenyl-, or octahydrofluorenyl- group covalently substituted with a divalent moiety, R", said divalent moiety, R", having from 1 to 50 atoms and being covalently bonded to Y, Cp further may be substituted with from 1 to 4 alkyl, halogen, aryl, haloalkyl, alkoxy, aryloxy or silyl groups containing up to 20 non-hydrogen atoms; and Y is a divalent substituent selected from groups of the formula —NR—, —PR—, —O— or —S—, wherein R is $C_{1-20}$ hydrocarbyl, and Y together with R", Cp and M forms a metallocycle; and X, if any, is a monovalent substituent selected from: hydride, halo, alkyl, aryl, silyl, germyl, aryloxy, alkoxy, amide, siloxy, phosphine groups, and mixtures thereof, said groups having up to 20 non-hydrogen atoms;

b) an active compound or complex, B', capable of converting the organometallic complex a) into a cationic complex of the formula:

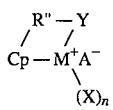

where Cp, M, Y, X and n are as previously defined, and $A'^-$ is the anion resulting from the combination of B' and R''' which is abstracted from complex a) or $A'^-$ is the counterion from complex B'; and c) an alumoxane;

the molar ratio of components b):a) being from 0.1:1 to 50:1, and the molar ratio of components c):a) being from 1:1 to 10,000:1.

The above compositions are usefully employed in the polymerization of addition polymerizable monomers, especially $C_{2-20}$ α-olefins, including mixtures thereof, to prepare polymers for molding, film, sheet, extrusion foaming and other applications.

DETAILED DESCRIPTION OF THE INVENTION

All references to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups.

The compositions of the present invention may be thought of as forming a mixture of a cationic species having a charge limited structure corresponding to the formula:

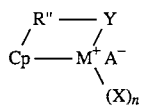

and the alumoxane, c).

Suitable alumoxanes preferably include $C_{1-4}$ alkylalumoxanes, especially methylalumoxane. Both cyclic and linear alumoxanes as well as mixtures thereof are suitable. Alumoxanes are well known in the art and methods for their preparation are illustrated by U.S. Pat. Nos. 4,542,199, 4,544,762, 5,015,749, and 5,041,585. Particularly preferred alumoxanes are so called modified alumoxanes, that are completely soluble in alkane solvents, especially heptane, and include very little, if any, trialkylaluminum contaminant. A technique for preparing such a modified alumoxane has been disclosed in U.S. Pat. No. 5,041,584. The teachings of the foregoing United States patents are incorporated herein in their entireties by reference thereto.

Active compounds, B', useful as component b) are those compounds capable of abstraction of the R substituent from a) to form an inert, noninterfering counter ion. A preferred active compound is tris(perfluorophenyl)boron. This compound results in the formation of an anionic species, $A'^-$, that is $R'''B(C_6F_5)_3$, where R''' is hydride or $C_{1-20}$ hydrocarbyl.

Examples of complexes useful as component b) include salts of a Bronsted acid and a noncoordinating, compatible anion. More particularly the non-coordinating, compatible anion may comprise a single coordination complex comprising a charge-bearing metal or metalloid core, which anion is both bulky and non-nucleophilic. The recitation "metalloid", as used herein, includes non-metals such as boron, phosphorus and the like which exhibit semi-metallic characteristics.

As used herein, the recitation "noncoordinating, compatible anion" means an anion which either does not coordinate to component a) or which is only weakly coordinated therewith remaining sufficiently labile to be displaced by a neutral Lewis base. A noncoordinating, compatible anion specifically refers to a compatible anion which when functioning as a charge balancing anion in the catalyst system of this invention, does not transfer an anionic substituent or fragment thereof to said cation thereby forming a neutral four coordinate metallocene and a neutral metal byproduct. "Compatible anions" are anions which are not degraded to neutrality when the initially formed complex decomposes and are noninterfering with desired subsequent polymerizations.

Preferred complexes useful as component b) are ferrocenium salts or silver salts of tetrakis(perfluorophenyl)borate. These components result in the formation of the anionic species, $B(C_6F_5)_4^-$, which is $A^-$.

It should be noted that alkylalumoxanes are not satisfactory for use as component b).

Component a) is preferably a cyclopentadienyl group containing complex of a Group 4 metal. The preferred X group, if any, is an alkyl, aryl, silyl, germyl, aryloxy, or alkoxy group having up to 20 non-hydrogen atoms. It should be noted that additional neutral Lewis base compounds may also be associated with the metal complex by coordinate covalent or other weaker bonding forces. Such compounds include ethers, phosphines, amines, etc. However, the presence of such neutral coordinating ligands is not preferred.

More preferably, CpR" is depicted by the formula:

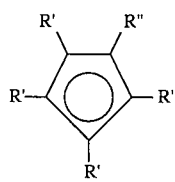

wherein:

R' each occurrence is independently selected from the group consisting of hydrogen, alkyl and silyl groups of up to 4 non-hydrogen atoms; and R" is —BR— or —ER$_2$— wherein E is a member of Group 14 of the Periodic Table of the Elements, and R is as previously defined.

In a highly preferred embodiment R"—Y— is

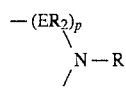

wherein:
  E independently each occurrence is carbon, silicon, or germanium;
  p is an integer from 1 to 4; and
  R is as previously defined.

Preferred cationic complexes formed by contacting components a) and b) correspond to the formula:

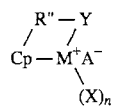

wherein:
  Cp, R", Y, X, M, n and $A^-$ are as previously defined.
  Most preferably:
  M is zirconium or titanium;
  Cp is a cyclopentadienyl group substituted with R" or such a cyclopentadienyl group further substituted with up to four $C_{1-4}$ alkyl groups;
  R" is $C_{1-4}$ dialkylsilanediyl especially dimethylsilanediyl;
  Y is $C_{1-4}$ alkylamido;
  X is $C_{1-4}$ alkyl, benzyl or 2-dimethylaminobenzyl;
  n is one; and
  $A^-$ is $R'''(B(C_6F_5)_3$ or $B(C_6F_5)_4^-$, where R''' is as previously defined.

The preferred ratio of components b):a) is 0.95:1 to 10:1, more preferably 1:1 to 5:1. The preferred ratio of component c):a) is 2:1 to 100:1, most preferably 3:1 to 10:1.

In general, the catalyst composition can be prepared by combining the components in a suitable solvent or diluent at a temperature within the range from −100° to 300° C., preferably 25° to 75° C. Suitable solvents or diluents include any of the compounds known in the prior art to be useful as solvents or diluents in the polymerization of olefins, diolefins and acetylenically unsaturated monomers. Suitable compounds include, but are not necessarily limited to, straight and branched-chain hydrocarbons such as isobutane, butane, pentane, hexane, heptane, octane and mixtures thereof; cyclic and alicyclic hydrocarbons such cyclohexane, cycloheptane, methylcyclohexane, methylcycloheptane and mixtures thereof and aromatic and alkyl-substituted aromatic compounds such as benzene, toluene, xylene and mixtures thereof. Suitable solvents also include liquid olefins which may act as monomers or comonomers including ethylene, propylene, butadiene, cyclopentene, 1-hexane, 3-methyl-1-pentene, 4-methyl-1-pentene, 1,4-hexadiene, 1-octene, 1-decene, styrene, and mixtures thereof. Mixtures of two of more of the foregoing solvents may also be used if desired.

The catalyst compositions are used in addition polymerizations using conditions well known in the prior art. It will, of course, be appreciated that the catalyst composition will form in situ if the components thereof are added directly to the polymerization process. However, it is preferred to form the catalyst in a separate step in a suitable solvent prior to adding the same to the polymerization reactor. The respective components may be combined in any order of addition to form the catalyst composition of the invention. The catalysts and components are sensitive to both moisture and oxygen and should be handled and transferred in an inert atmosphere such as nitrogen, argon or helium.

In a preferred embodiment, the catalyst is used to polymerize $C_{2-20}$ α-olefins and mixtures thereof, particularly ethylene or propylene, most preferably ethylene, at a temperature within the range from 0° C. to 220° C., preferably 25° C. to 160° C. and at a pressure within the range from atmospheric to 6,900 kPa (1000 psig) preferably 100 kPa to 4,800 kPa (15 to 700 psig). In a most preferred embodiment of the present invention, the catalyst is used either to homopolymerize ethylene or to copolymerize ethylene with a lower α-olefin having from 3 to 8 carbon atoms (including styrene) thereby yielding a copolymer. In both the preferred and most preferred embodiments, the monomers will be maintained at polymerization conditions for a time from 1 to 60 minutes. Suitably the catalyst will be used at a concentration from $10^{-7}$ to $10^{-1}$ moles per mole of monomer. A solvent for the reactants and/or the polymer may be used if desired.

Having thus broadly described the present invention it is believed that the same will become even more apparent by reference to the following examples. It will be appreciated, however, that the examples are presented solely for the purpose of illustration and should not be construed as limiting the invention.

EXAMPLES 1–3

Catalyst Preparation

A known weight of the organometallic complex, (t-butylamido)dimethyl(tetramethyl-$\eta^5$-cyclopentadienyl)silane titanium dimethyl $(Me_4C_5\text{-}Me_2Si\text{-}N\text{-}t\text{-}Bu)Ti(CH_3)_2$, was dissolved in toluene to give a clear, 0.005M solution. The complex was prepared from $(Me_4C_5\text{-}Me_2Si\text{-}N\text{-}t\text{-}Bu)TiCl_2$ as disclosed in U.S. Ser. No. 758,654, filed Sep. 12, 1991 (equivalent to EP-A418,044 published Mar. 20, 1991). The dichloride salt in turn was prepared according to the method outlined in U.S. Ser. No. 545,403, filed Jul. 3, 1990, (equivalent to EP-A 416,815). A cationic complex solution of 10 mL total volume was prepared by adding 6.0 mL of mixed alkane solvent (Isopar™ E, available from Exxon Chemical Inc.), 2.0 mL of the Ti reagent solution and 2.0 mL of a 0.010M solution of tris(perfluorophenyl)boron in toluene to a 250 ml glass bottle. The solution was mixed for a few minutes and transferred by syringe to a catalyst injection cylinder on the polymerization reactor.

Polymerizations

A stirred, one-gallon (3.79 L) autoclave reactor was charge with two liters of Isopar™ E containing varying amounts of methylalumoxane (MAO) solution and 150 mL of octene-1 which had been partially purified by passing over a molecular sieve bed before heating to reaction temperature. The reactor was charged with ethylene sufficient to bring the total pressure to 450 psig (3.1 MPa). An amount of the cationic complex solution as described under catalyst preparation was injected into the reactor. The reactor temperature and pressure were maintained constant at the desired final pressure and temperature by continually feeding ethylene during the polymerization run and cooling the reactor as necessary. The rate and duration of the reaction were monitored by measuring the demand flow of ethylene to the reactor for each polymerization. Ethylene/1-octene copolymer yield (reported as g PE) was calculated based on mass flow of ethylene to the reactor during the run. Results as a function of MAO content are contained in Table 1.

TABLE 1

| Example | Ti (μMole) | B:Ti[a] | Al[b] (μMole) | Al:Ti | Yield (gPE) |
|---------|------------|---------|---------------|-------|-------------|
| A* | 10 | 2:1 | 0 | 0 | 46 |
| B* | 10 | 2:1 | 0 | 0 | 32 |
| 1 | 10 | 2:1 | 50 | 5 | 70 |
| 2 | 10 | 2:1 | 100 | 10 | 222 |
| 3 | 10 | 2:1 | 200 | 20 | 222 |

*Comparative, not an example of the invention, no MAO.
[a]Molar ratio boron:titanium
[b]Aluminum value represented by methylalumoxane.

It may be seen that improved polymer yields result under these reaction conditions from the use of the catalyst composition of the present invention.

EXAMPLE 4

The polymerization of Examples 1–3 was repeated excepting that the 1-octene employed is not purified prior to use in the reactor. Results are contained in Table 2.

TABLE 2

| Example | Ti (μMole) | B:Ti[a] | Al[b] (μMole) | Al:Ti | Yield (gPE) |
|---------|------------|---------|---------------|-------|-------------|
| C* | 10 | 2:1 | 0 | 0 | 0 |
| 4 | 10 | 2:1 | 130 | 13 | 211 |

*Comparative, not an example of the invention, no MAO.
[b]molar ratio boron:titanium
[b]aluminum value represented by methylalumoxane.

The improvement in resistance to catalyst poisons is clearly illustrated by comparison of the results in Table 2.

EXAMPLES 5–6

The reaction conditions of Examples 1–3 were repeated excepting that the catalyst composition was prepared separately by combining all three components before injecting the same into the reactor. Comparative tests omitting the boron component, and substituting triethylaluminum for methylalumoxane are also performed. Results are contained in Table 3.

TABLE 3

| Example | Ti (μMole) | B:Ti[a] | Al[b] μ(Mole) | Al:Ti | Yield (gPE) |
|---------|------------|---------|---------------|-------|-------------|
| 5[c] | 7.5 | 2:1 | 75 | 10 | 247 |
| 6[d] | 7.5 | 2:1 | 75 | 10 | 214 |
| D*[e] | 7.5 | 0 | 375 | 50 | 0 |
| E*[f] | 7.5 | 2:1 | 75 | 10 | 0 |

*Comparative, not an example of the invention.
[b]Molar ratio boron:titanium.
[b]Aluminum value represented by methylalumoxane.
[c]The titanium complex was mixed with tetrakis(perfluorophenyl)boron then added to MAO solution in Isopar ™ E.
[d]AMAO solution in Isopar ™ E was mixed with tetrakis(perfluorophenyl)boron and the titanium complex added last.
[e]Boron component omitted.
[f]Triethylaluminum substituted for MAO.

By examination of the results of Table 3 it may be seen that formation of a cationic species is necessary and that trialkylaluminum is not substantially effective in place of MAO.

EXAMPLES 7–17

The reaction conditions of Examples 1–3 were repeated using different titanium complexes, temperatures, octene contents, hydrogen pressures and alumoxanes. In Example 7, the titanium complex was (t-butylamido)dimethyl(tetramethyl-$\eta^5$-cyclopentadienyl)silanetitanium dibenzyl, prepared by a method analogous to that of Example 1. In Example 8 the titanium complex was (t-butylamido)dimethyl(tetrahydrofluorenyl)silanetitanium dimethyl, also prepared by a method analogous to that of Example 1. All reactions were conducted at 120° C. excepting Examples 13 and 14 that were conducted at 140° C. and 160° C. respectively. Moles of octene were 1.0 excepting for run 11, when 0.5 moles were used. In Examples 15–17 and the comparative examples, the 1-octene feed was highly purified by first contacting with a molecular sieve bed followed by contacting with an alumina based deoxygenating agent (Q-5, available from Engelhard Corporation). All polymers were recovered, devolatilized and dried to determine yield. Polymer properties were tested by standard techniques. Results are contained in Table 4.

TABLE 4

| Example | Hydrogen (mmole) | Ti (μMole) | B (μMole) | Al (μMole) | Yield (gPE) | Efficiency (gPE/μMole Ti) | Density | $I_2$[a] | $I_{10}/I_2$[b] |
|---------|------------------|------------|-----------|------------|-------------|---------------------------|---------|---------|------------------|
| 7[c] | 10 | 7.5 | 15 | 75 | 152 | 20,300 | 0.9098 | 2.23 | 5.74 |
| 8[c] | 10 | 7.5 | 15 | 75 | 96 | 12,800 | 0.8972 | 2.02 | 6.56 |
| 9[c] | 0 | 7.5 | 15 | 75 | 193 | 25,700 | 0.8998 | 0.13 | 8.85 |
| 10[c] | 20 | 7.5 | 15 | 75 | 227 | 30,300 | 0.9109 | 13.50 | 6.17 |
| 11[c] | 10 | 7.5 | 15 | 75 | 210 | 28,000 | 0.9233 | 3.37 | 6.00 |
| 12[d] | 0 | 4 | 8 | 40 | 245 | 61,300 | 0.9033 | 0.80 | 8.70 |
| 13[d] | 0 | 6 | 12 | 60 | 215 | 35,800 | 0.9060 | 0.74 | 8.02 |
| 14[d] | 0 | 8 | 16 | 80 | 140 | 17,500 | 0.9118 | 1.96 | 7.09 |
| 15[d] | 0 | 3 | 6 | 30 | 135 | 45,000 | 0.9011 | 0.16 | 6.86 |
| F*[d] | 0 | 7.5 | 15 | 0 | 162 | 21,600 | 0.9070 | 0.45 | 7.52 |
| 16[d] | 4 | 3 | 6 | 30 | 160 | 53,000 | 0.9039 | 1.09 | 6.25 |
| G*[d] | 4 | 7.5 | 15 | 0 | 170 | 22,700 | 0.9085 | 2.56 | 6.42 |
| 17[d] | 30 | 3 | 6 | 30 | 155 | 51,700 | 0.9128 | 52.60 | 5.51 |
| H*[d] | 30 | 7.5 | 15 | 0 | 161 | 21,500 | 0.9175 | 125.00 | 5.93 |

*Comparative, not an example of the invention.
[a]$I_2$ is measured according to ASTM D-1238 and indicates melt flow properties. Higher values of $I_2$ indicate greater melt flow.
[b]$I_{10}$ is measured according to ASTM D-1238.
[c]Methylalumoxane having molecular weight 1200 available from Schering A.G. in toluene.

TABLE 4-continued

| Example | Hydrogen (mmole) | Ti (μMole) | B (μMole) | Al (μMole) | Yield (gPE) | Efficiency (gPE/μMole Ti) | Density | $I_2{}^a$ | $I_{10}/I_2{}^b$ |
|---|---|---|---|---|---|---|---|---|---|

[d]Methylaluminoxane was modified methylalumoxane, prepared according to U.S. Pat. No. 5,041,584, available from Texas Alkyls.

By reference to Table 4 it may be seen that hydrogen may be utilized to control polymer melt flow properties and in the presence of alumoxane the effect of hydrogen can be moderated. Thus the catalyst is not extremely sensitive to the presence of hydrogen.

What is claimed is:

1. A catalyst composition comprising a cationic complex of the formula:

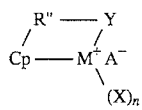

wherein:

M is a metal of Group 4 of the Periodic Table of the Elements having an oxidation state of 3 or 4, bound in an $\eta^5$ bonding mode to Cp;

n is zero or one, depending on the oxidation state of M;

Cp is a cyclopentadienyl-, indenyl-, tetrahydroindenyl-, fluorenyl-, or octahydrofluorenyl- group covalently substituted with a divalent moiety, R", said divalent moiety, R", having from 1 to 50 atoms and being covalently bonded to Y, Cp further may be substituted with from 1 to 4 alkyl, halogen, aryl, haloalkyl, alkoxy, aryloxy or silyl groups containing up to 20 non-hydrogen atoms;

Y is a divalent substituent selected from the group consisting of —NR—, —PR—, —O— and —S—, wherein R is $C_{1-20}$ hydrocarbyl, and Y together with R", Cp and M forms a metallocycle;

X, if any, is a monovalent substituent selected from the group consisting of hydride, halo, alkyl, aryl, silyl, germyl, aryloxy, alkoxy, amide, siloxy, and phosphine groups, and combinations thereof, said groups or combination having up to 20 non-hydrogen atoms; and A⁻ is an inert, noncoordinating anion, and an alumoxane; the molar ratio of alumoxane to cationic complex being from 0.1:1 to 50:1.

2. A catalyst composition according to claim 1 wherein A⁻ is R'''B(C₆F₅)₃⁻ or B(C₆F₅)₄⁻, where R''' is hydride or $C_{1-20}$ hydrocarbyl.

3. The catalyst composition according to claim 1 wherein CpR" is depicted by the formula:

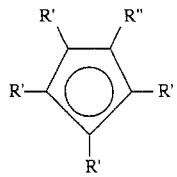

wherein:

R' each occurrence is independently selected from the group consisting of hydrogen, alkyl and silyl groups of up to 4 non-hydrogen atoms; and R" is —BR— or —ER₂— wherein E is a member of Group 14 of the Periodic Table of the Elements, and R is $C_{1-20}$ hydrocarbyl.

4. The catalyst composition according to claim 3 wherein R"—Y— is

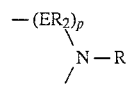

wherein:

E independently each occurrence is carbon, silicon, or germanium;

p is an integer from 1 to 4; and

R is $C_{1-20}$ hydrocarbyl.

5. A catalyst composition comprising the reaction product of:

a) an organometallic complex of the formula:

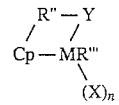

wherein:

M is a metal of Group 4 of the Periodic Table of the Elements having an oxidation state of +3 or +4, bound in an $\eta^5$ bonding mode to Cp;

n is zero or one, depending on the oxidation state of M;

R''' is hydride or $C_{1-20}$ hydrocarbyl;

Cp is a cyclopentadienyl-, indenyl-, tetrahydroindenyl-, fluorenyl-, or octahydrofluorenyl-group, covalently substituted with a divalent moiety, R", having from 1 to 50 atoms and being covalently bonded to Y, Cp further may be substituted with from 1 to 4 alkyl, halogen, aryl, haloalkyl, alkoxy, aryloxy or silyl groups containing up to 20 non-hydrogen atoms; and Y is a divalent substituent selected from the group consisting of —NR—, —PR—, —O— and —S—, wherein R is $C_{1-20}$ hydrocarbyl, and Y together with R", Cp and M forms a metallocycle; and X, if any, is a monovalent substituent selected from the group consisting of hydride, halo, alkyl, aryl, silyl, germyl, aryloxy, alkoxy, amide, siloxy, phosphine groups, and mixtures thereof, said groups having up to 20 non-hydrogen atoms;

b) an active compound or complex, B', capable of converting the organometallic complex a) into a cationic complex of the formula:

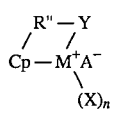

where Cp, M, Y, X and n are as previously defined, and $A^-$ is the anion resulting from the combination of B' and R which is abstracted from complex a) or $A^-$ is the counterion from complex B'; and c) an alumoxane;

the molar ratio of b):a) being from 0.1:1 to 50:1, and the ratio of c):a) being from 1:1 to 10,000:1.

6. A process for polymerizing an olefin, diolefin or acetylenic compound comprising contacting the olefin, diolefin or acetylenic compound or mixture thereof with a composition according to claim 1 or claim 5 under polymerization conditions and recovering the resulting polymer.

* * * * *